United States Patent
VanBlon et al.

(10) Patent No.: US 11,528,246 B2
(45) Date of Patent: Dec. 13, 2022

(54) GRAPHICAL USER INTERFACES WITH INDICATIONS THAT ELECTRONIC MESSAGES HAVE BEEN ACTED UPON

(71) Applicant: Lenovo (Singapore) Pte. Ltd., Singapore (SG)

(72) Inventors: Russell Speight VanBlon, Raleigh, NC (US); John Carl Mese, Cary, NC (US); Mark Patrick Delaney, Raleigh, NC (US); Arnold S. Weksler, Raleigh, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/188,959

(22) Filed: Mar. 1, 2021

(65) Prior Publication Data
US 2022/0278952 A1    Sep. 1, 2022

(51) Int. Cl.
*H04L 51/234*    (2022.01)
*H04L 51/224*    (2022.01)

(52) U.S. Cl.
CPC .......... *H04L 51/234* (2022.05); *H04L 51/224* (2022.05)

(58) Field of Classification Search
CPC ....... H04L 51/18; H04L 51/34; H04L 51/234; H04L 51/224
See application file for complete search history.

(56) References Cited

U.S. PATENT DOCUMENTS

| | | | |
|---|---|---|---|
| 10,178,059 B1* | 1/2019 | Garg | H04L 51/08 |
| 2007/0100991 A1* | 5/2007 | Daniels | H04L 51/34 |
| | | | 709/224 |
| 2012/0095979 A1* | 4/2012 | Aftab | H04L 51/36 |
| | | | 707/706 |
| 2014/0258424 A1* | 9/2014 | Ganesh | G06Q 10/0833 |
| | | | 709/206 |
| 2016/0094705 A1* | 3/2016 | Vendrow | H04W 4/12 |
| | | | 382/103 |
| 2016/0182412 A1* | 6/2016 | Kabbes | H04L 29/08072 |
| | | | 709/206 |
| 2017/0069046 A1* | 3/2017 | Slipakoff | G06Q 50/18 |
| 2018/0246933 A1* | 8/2018 | Darrow | G06F 16/9024 |
| 2018/0278564 A1* | 9/2018 | Teixeira De Souza Filho | |
| | | | H04L 51/18 |

(Continued)

OTHER PUBLICATIONS

"Email tracking", Wikipedia, retrieved from https://en.wikipedia.org/wiki/Email_tracking on Jan. 14, 2021.

(Continued)

*Primary Examiner* — Ryan J Jakovac
(74) *Attorney, Agent, or Firm* — John M. Rogitz; John L. Rogitz

(57) ABSTRACT

In one aspect, a first device may include at least one processor and storage accessible to the at least one processor. The storage may include instructions executable by the at least one processor to transmit a message to a second device different from the first device and to receive back an indication from the second device that the message has been acted upon beyond simply being read using the second device. The instructions may also be executable to present data related to the indication on a display accessible to the at least one processor. In some examples, email tracking software may be used to receive back the indication.

20 Claims, 6 Drawing Sheets

(56) References Cited

U.S. PATENT DOCUMENTS

| | | | |
|---|---|---|---|
| 2019/0005389 A1* | 1/2019 | Glyman | G06Q 10/02 |
| 2019/0297040 A1* | 9/2019 | White | H04L 51/14 |
| 2020/0028812 A1* | 1/2020 | McBeath | H04M 1/72451 |
| 2021/0157974 A1* | 5/2021 | Xie | H04L 51/32 |
| 2021/0406836 A1* | 12/2021 | Bar-on | G06Q 10/107 |

OTHER PUBLICATIONS

"Return receipt", Wikipedia, retrieved from https://en.wikipedia.org/wiki/Return_receipt on Jan. 14, 2021.

"Web beacon", Wikipedia, retrieved from https://en.wikipedia.org/wiki/Web_beacon on Jan. 14, 2021.

\* cited by examiner

US 11,528,246 B2

GRAPHICAL USER INTERFACES WITH INDICATIONS THAT ELECTRONIC MESSAGES HAVE BEEN ACTED UPON

FIELD

The disclosure below relates to technically inventive, non-routine solutions that are necessarily rooted in computer technology and that produce concrete technical improvements. In particular, the disclosure below generally relates to graphical user interfaces with indications that electronic messages have been acted upon.

BACKGROUND

As recognized herein, electronic messaging systems do not currently have the technical capability to confirm, to a message sender, that an electronic message has been acted upon by a recipient in a meaningful way. Accordingly, there are currently no adequate solutions to the foregoing computer-related, technological problem.

SUMMARY

Thus, in one aspect a first device includes at least one processor and storage accessible to the at least one processor. The storage includes instructions executable by the at least one processor to transmit a message to a second device different from the first device and to receive back an indication from the second device that the message has been acted upon beyond being read by a user using the second device. The instructions are also executable to present data related to the indication on a display accessible to the at least one processor.

So, for example, the instructions may be executable to, prior to transmission of the message, configure the message to instigate the second device to transmit the indication upon the message being acted upon using the second device.

In various example implementations, the indication may indicate that the message has been flagged using the second device, that the message has been marked as unread using the second device, that an entry has been made in an electronic to do list that relates to a subject of the message, and/or that an entry has been made in an electronic calendar that relates to a subject of the message. Additionally or alternatively, the indication may indicate a first amount of text of the message that has been viewed using the second device, where the first amount of text may be less than all of the text of the message, and in some examples the first amount may be expressed in the indication as a percentage or fraction. Still further, in some examples the indication may indicate that an attachment to the message has been downloaded at the second device. Also in some examples, the message may include a first email and the indication may indicate that a reply email to the first email has been initiated.

Also in some examples, the first device may include the display.

In another aspect, a method includes transmitting an email from a first device to a second device different from the first device and, responsive to receiving a communication back from the second device, presenting an indication on a display accessible to the first device that the email has been acted upon at the second device beyond being read by a user.

Thus, in certain example embodiments the method may include, prior to transmitting the email, using email tracking software to configure the email to instigate the second device to transmit the indication upon the email being acted upon using the second device.

In various example implementations, the indication may indicate that the email has been marked as unread using the second device, that an entry has been made in an electronic calendar that relates to a subject of the email, that an attachment to the email has been viewed using the second device, and/or that edits have been made locally at the second device to an attachment to the email. Also in some examples, the indication may indicate a first amount of text of the email that has been viewed using the second device, where the first amount of text may be less than all of the text of the email.

In still another aspect, at least one computer readable storage medium (CRSM) that is not a transitory signal includes instructions executable by at least one processor to transmit a message from a first device to a second device different from the first device and to use a display to present a graphic that the message has been acted upon at the second device beyond simply being read using the second device.

In some examples, a server may include the at least one processor and the server may use email tracking software to track actions at the second device related to the message. The server may communicate with the first device to use the display as located on the first device to present the graphic.

The details of present principles, both as to their structure and operation, can best be understood in reference to the accompanying drawings, in which like reference numerals refer to like parts, and in which:

DETAILED DESCRIPTION

Figure 1:
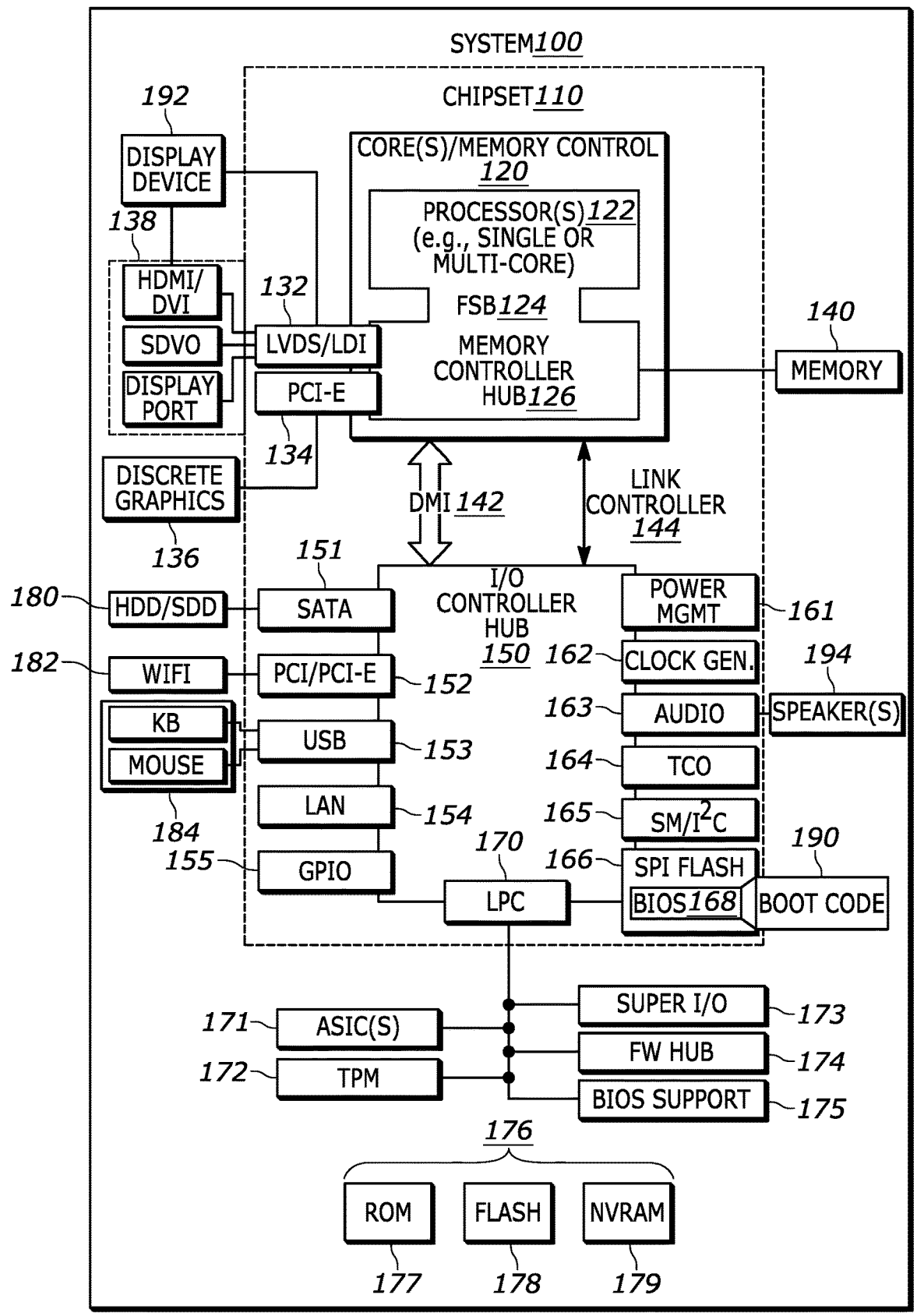
FIG. 1 is a block diagram of an example system consistent with present principles.

Among other things, the present application relates to technical improvements to computer systems to perform electronic tracking of actions taken in relation to sent messages.

So, for example, when a message is marked unread by a recipient, this action may instigate the recipient's device to notify the sender so the sender is aware the recipient might have seen the message but needs more time to go back to it and take action. This could also apply to message flags and other actions. For example, the sender could choose to be notified of specific events including not just unread markings and flags but also to-do items and/or action items tied to the message. Thus, in some examples the sender may have assurance of things the recipient did with the email thus far.

As one example, suppose Sam Sender sends an email to Roy Receiver. Roy flags the email so he can follow up on it later. Based on Roy flagging the email, Roy's email client provides a "flagged" notification to Sam. Additionally, Sam can choose to receive such notifications in real-time or he can navigate to a graphical user interface (GUI) like the GUI of FIG. 3 (described below) in order to pull the information for a specific message on-demand.

As another example, suppose again that Sam Sender sends an email to Roy Receiver. Roy has an email preview function enabled for his email account which marks the email as read when Roy views a preview even if he does not actually open the message in full. Thus, Roy might mark the email as unread in his email client. Similar to the example above, Sam can view "marked unread" notifications about the email via real-time notifications or via on-demand requests for individual emails.

Also in some examples, a message sender and recipient may both opt-in to protect digital privacy. Additionally or alternatively, specific users/groups within an organization can auto-opt-in to sending/receiving such notifications to protect the digital privacy of those users outside of the context of tasks for the organization.

Indications or notifications that may be presented to a message sender may include, but are not limited to, email flags and unread markings. They might also pertain to an amount of text viewed in a message (e.g. percentage) as determined based on camera input and eye tracking to identify how far down an email a user has read, and/or as determined based on the amount of text actually presented on the user's display over time or at any one time relative to the total text length of the email. Notifications may also be presented that pertain to actions taken in relation to message attachments, such as notifications pertaining to whether each attachment has been opened, if the attachment were fully viewed (e.g., using eye tracking as set forth above), if edits were made to the attachment, etc. Notifications may also pertain to whether a message reply draft had been started, whether a message were forwarded or delegated/assigned to others, whether tasks were generated automatically or manually by the recipient (and even if those tasks were assigned to someone else), etc.

Additionally, messages for which related actions may be tracked are not limited to emails and may also include, as other examples, short message service (SMS) text messages, instant messages, social networking messages, and still other message types.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122, such as for eye tracking as set forth above. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
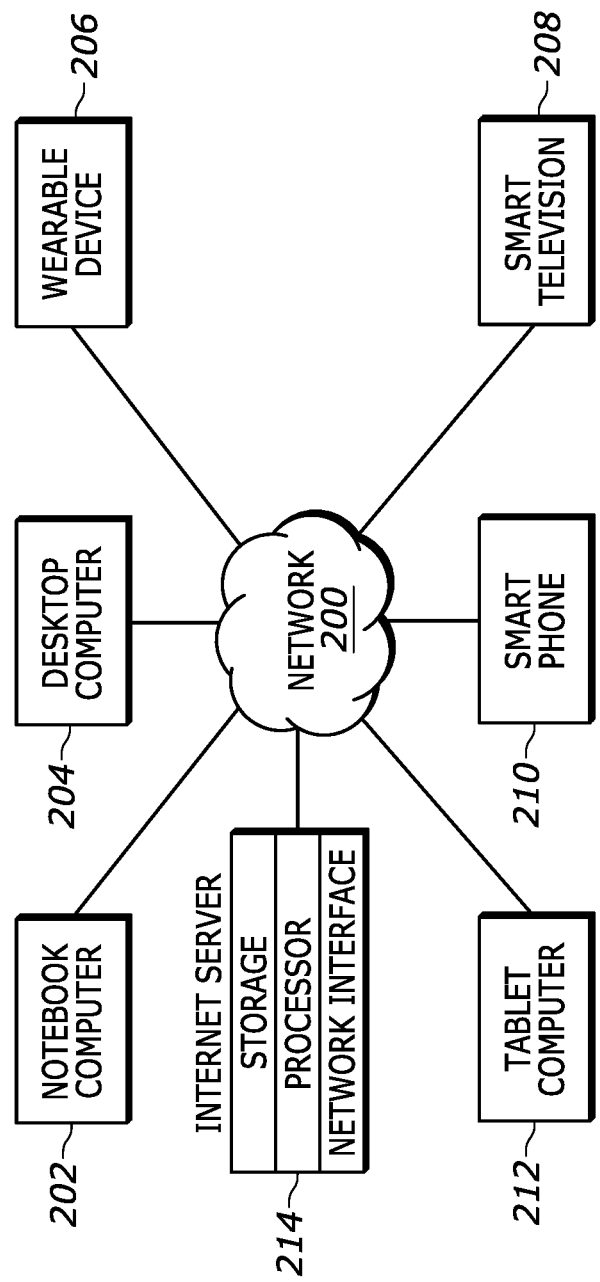
FIG. 2 is a block diagram of an example network of devices consistent with present principles.

Turning now to FIG. 2, example devices are shown communicating over a network 200 such as the Internet consistent with present principles (e.g., to transmit messages such as emails back and forth and to electronically track related actions). It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles, including transmission of messages such as emails and the tracking of related electronic actions.

Figure 3:
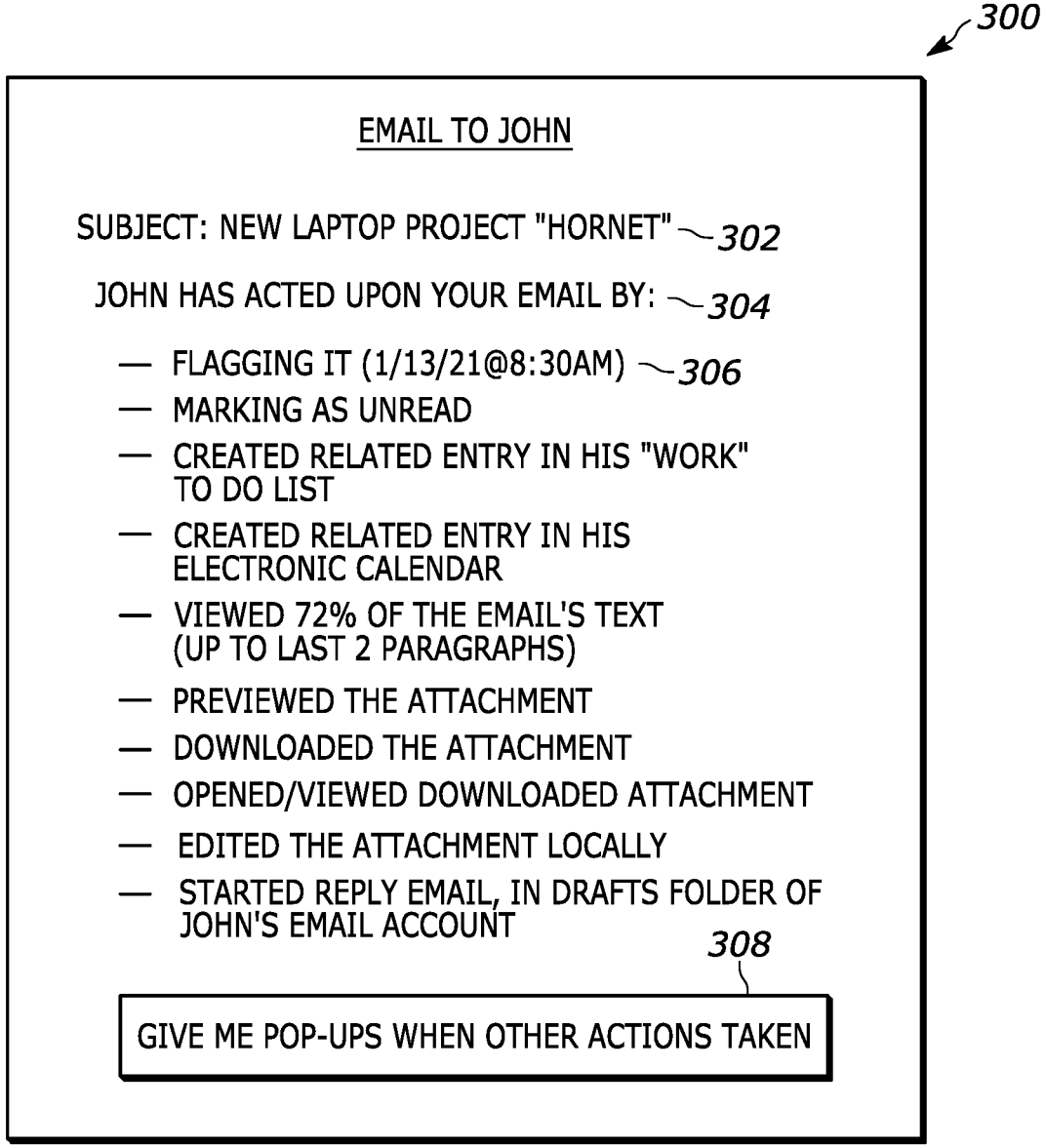
FIG. 3 shows an example graphical user interface (GUI) with various types of indications that may be presented at a message sender's device consistent with present principles.

Now referring to FIG. 3, suppose a user named Russell has sent an email to a work colleague named John. Also suppose Russell wants to know what electronic action(s) John has taken in relation to the email. To ascertain what electronic action(s) John may have taken in relation to the email and/or its contents, email tracking software may be employed by Russell's email client so that Russell can provide a command through the email client to present the GUI 300 shown in FIG. 3. For example, the command may have been provided based on selection of a "get info" button presented next to the email itself as residing in the sent folder for Russell's email account. Additionally or alternatively, the GUI 300 or a corresponding pop-up notification may also be presented responsive to John taking a new or additional action in relation to the email as will be set forth further below (e.g., marking the email as "unread") after it was initially sent by Russell.

As shown in FIG. 3, the GUI 300 may include a subject line 302 showing the original subject line or title of the email Russell sent to John. The GUI 300 may also include a list 304 of one or more indications related to that email. Example indications reflected in FIG. 3 include an indication 306 that Russell's email has been flagged by John using John's device/email account. The indication 306 may also include a parenthetical note as shown in FIG. 3 that indicates a date and time of day at which John took the associated action (flagging, in this case) as reported by email tracking software code embedded in the initial email so that Russell can determine exactly when John took the associated electronic action. Note that although date and time are only shown for the indication 306, similar date and time notes may also be presented next to each associated indication in the list 304 even though they are omitted for simplicity.

Additionally, note that flagging as discussed above may include providing user input to change the color, shape, or other appearance of a flag icon or other icon type as presented on or next to an email preview or listing of the email in the user's email inbox (or another email folder). For example, the user may click on the icon itself to change its appearance and/or color from white to red, thereby distinguishing its appearance from other icons for other emails and hence flagging the associated email to draw the user's attention to it. The icon whose appearance has been changed may also be presented on the associated email itself once it has been opened from the inbox (or other folder) and presented on the associated user's display.

In any case, other types of indications beyond flagging are also shown as part of the list 304. For example, an indication may be presented that indicates that the email has been marked as unread using John's device/email account (thereby making the email as presented in John's inbox appear as having an unread designation and/or color even if it has already been opened and read). An indication may also be presented that indicates that an entry has been made in John's electronic to do list that relates to a subject of the email (e.g., their common project called "Hornet"), that an entry has been made in John's personal electronic calendar or a shared electronic calendar that relates to a subject of the email (e.g., "Hornet" again), and/or that a reply email from John back to Russell has been initiated that replies to Russell's initial email (with the indication further indicating a folder in which the draft is currently located as shown).

Still further, one of the indications in the list 304 may indicate a first amount of text of the email that has been viewed using John's device, where the first amount of text may be less than all of the text of the message. The first amount of text of the email may, for example, be expressed as a percentage as shown in FIG. 3 but it may also be expressed as a fraction or another way.

Additionally, one or more of the indications presented on the GUI 300 may relate to attachments to Russell's email to John, such as files and folders that Russell may have attached to the initial email itself for John to download to his local device through the initial email. For example, a word processing document or image file may have been attached to Russell's email. Thus, as shown in FIG. 3, another example indication that may be presented as part of the GUI 300 is an indication that John has previewed the email's attachment without actually downloading it locally to storage on John's device (e.g., John viewed a "preview" of the file as still stored in and provided by cloud storage maintained at an email server as part of web-based email access). Other example indications related to message attachments that may be presented on the GUI 300 include an indication that the attachment to the email has been downloaded locally to storage on John's device, that the attachment to the email as downloaded locally to John's device has been opened and/or viewed using John's device (in addition to being downloaded), and/or that edits have been made locally at John's device to the local copy of the attachment as stored at John's device (e.g., editing the text of a word processing document).

Additionally, note that in some examples the GUI 300 may also include a section listing indications of actions that the email recipient (John) has not taken yet, such as forwarding the email to a third party or delegating/assigning the email to others. In some examples the GUI 300 can also include a listing of any types of indications, including those described above, that the recipient has not authorized to be reported to Russell through the email tracking software so that Russell may know not to expect any indication of that type either way.

Still further, in some examples the GUI 300 may include a selector 308 that may be selectable based on touch or cursor input to command Russell's device to provide pop-up notifications on the display of Russell's device responsive to John taking additional electronic actions in the future related to Russell's email. The pop-up notifications may or may not be full-screen notifications, and may be more simple than the GUI 300 in that it may only indicate the most-recent electronic action John took in relation to the email rather than all electronic actions John has already taken in relation to the email.

As for how the GUI 300 itself may be generated, again note that Russell's email client may use email tracking software to embed code in the email sent to John that may instigate John's device to autonomously report back one or more of the indications discussed above responsive to John taking the associated electronic action at his device (e.g., a laptop computer or smartphone). To this end, web beacons and other single-pixel gifs and clear gifs can be embedded in the email. Other suitable tracking tools can also be used such as click and keyboard tracking.

The code may be embedded in the email locally at Russell's own client/personal device, and/or may be embedded at a server hosting the email service through which the email is sent. Also note that the GUI 300 itself may be generated locally at Russell's device or by the email service provider/server based on receipt of a return email or other type of message to Russell's email address (or the server itself) from John's device that specifies data related to electronic actions John has taken, which may then be used to present the indications in the list 304. The return email or other transmission may therefore have been instigated at John's device/email account without user input from John to do so based on the embedded code that Russell's initial email included.

To reiterate, FIG. 3 shows an example and so still other ways of presenting indications as described herein may be used. For example, different non-text icons or other graphics respectively associated with different types of the indications discussed above may be presented in addition to or in lieu of the text indications shown in FIG. 3.

Additional details will now be described in reference to FIG. 4, which shows example logic that may be executed by a device such as the system 100, Russell's device, and/or an email server in any appropriate combination. For example, the email server may communicate with and act in conjunction with Russell's device to use tracking software to track actions at the John's device, and to also communicate with Russell's device to use the display of Russell's device to present the GUI 300 and/or other graphics consistent with present principles.

Beginning at block 400, the device may receive user input composing a message, such as input specifying a message recipient, subject or title of the message, and message body as may be input using a message composition GUI or application. The logic may then move to block 402 where the device may receive user input specifying one or more types of indications regarding the message that the message sender would like to receive back. An example GUI through which the user may provide such input at block 402 will be described later in reference to FIG. 6.

Figure 4:
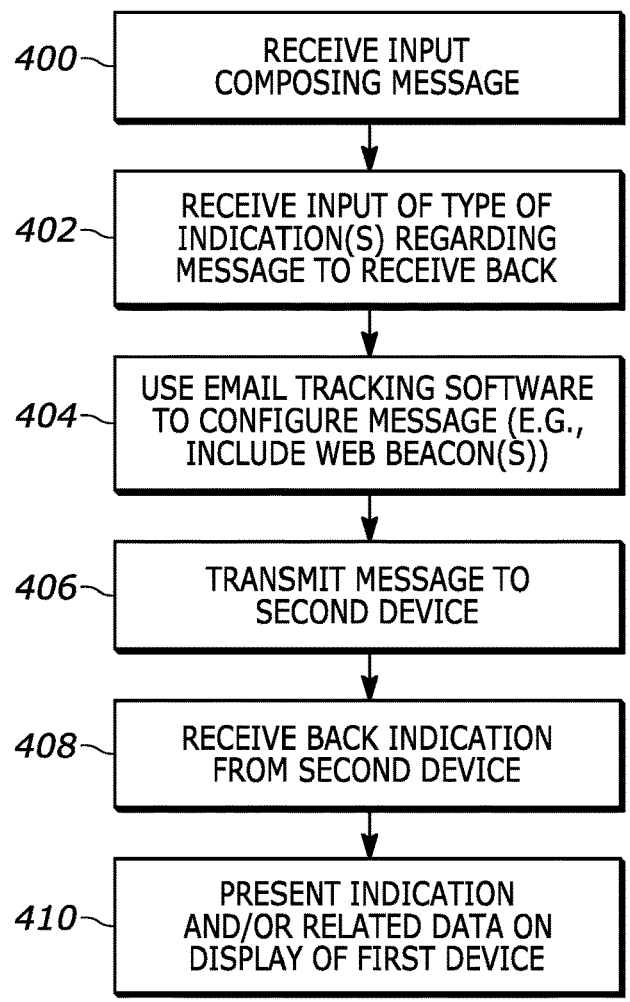
FIG. 4 illustrates example logic in example flow chart format that may be executed by a message sender's device consistent with present principles.

But still in reference to FIG. 4, from block 402 the logic may then proceed to block 404. At block 404 the device may use email tracking software or other electronic tracking software to configure the message so that reports are autonomously generated and sent back to the sender's email account/device based on the types of indications that are requested. Again, web beacons and other invisible tracking images and/or single-pixel gifs configured for tracking may be included in the message body, such as JavaScript tags.

Message disposition notifications (MDNs) may also be used in certain examples by inserting various types of indication requests into the message's header (e.g., "X-Confirm-MarkedUnread-To:" or "X-Confirm-Attachment-Downloaded-To:"). Still further, tracking cookies, a Beacon application programming interface (API), and other online/electronic tracking techniques may also be used.

For example, in addition to or in lieu of the foregoing, an email client or service provider common to both the sender and recipient may use its own software or application (as used by both people at their own devices) to perform the electronic tracking. The provider or provider application may then provide requested indications since actions taken at either user's device in relation to messages sent through the client/provider may be logged in this scenario even without embedding web beacons or adding to the header for the message itself.

From block 404 the logic may then proceed to block 406 where the device may send the message through one or more servers or nodes to ultimately reach the recipient. Then at block 408 the device may receive back one or more indications from the recipient's device as described herein (e.g., that the message sent at block 406 has been read and then marked as "unread"). Then at block 410 the device executing FIG. 4 may present the indications on its own display.

Figure 5:
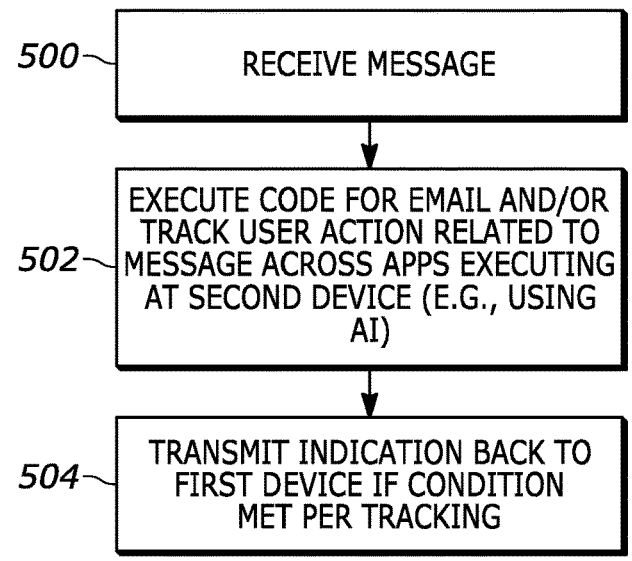
FIG. 5 illustrates example logic in example flow chart format that may be executed by a message recipient's device consistent with present principles.

Now in reference to FIG. 5, it shows example logic that may be executed by the recipient's device and/or an email server based on the recipient user taking one or more actions in relation to a received message. For example, the email server may communicate with and act in conjunction with a recipient's device to use tracking software and/or an email application executing locally at the recipient's device to track actions at the recipient's device and communicate associated indications to the sender's device.

Beginning at block 500, the recipient's device may receive the message. The logic may then move to block 502 where the device may execute or activate the tracking code included in the message itself, and/or otherwise track user action through the copy of the messaging application being executed locally at the device to receive the message.

Additionally, in some examples as long as the messaging application remains open and executing locally at the device, at block 502 it may track user action across other applications executing locally (or remotely) as well. For example, the application may use artificial intelligence (AI) architecture to determine that after opening a message, the recipient has opened a separate electronic calendar application (or to-do list application) and created an entry in his/her electronic calendar that includes a keyword that was also used in the received message itself. The AI architecture may also use natural language processing to track other words not included in the received email but that still correlate to a subject identified from the received message in order to instigate transmission of associated indications. To do the foregoing, the AI architecture may employ one or more artificial neural networks each having an input layer, output layer, and multiple hidden layers in between that are configured and weighted to make inferences about whether a word or set of words indicated in user input to, for example, a to do list of a to do list application or electronic calendar of an electronic calendar application can be correlated to a topic, subject, or same word in the received message itself. For example, a convolutional or recurrent deep neural network for natural language processing (NLP) may be adopted and trained in supervised or unsupervised fashion to train the neural network to make inferences as set forth above based on different sets of labeled and/or unlabeled data.

From block 502 the logic may then proceed to block 504. At block 504 the receiving device may transmit back, to the device that sent the message, one or more indications as described herein (assuming the respective condition is met, such as sending a "message marked unread" indication responsive to the received message being marked as unread).

Figure 6:
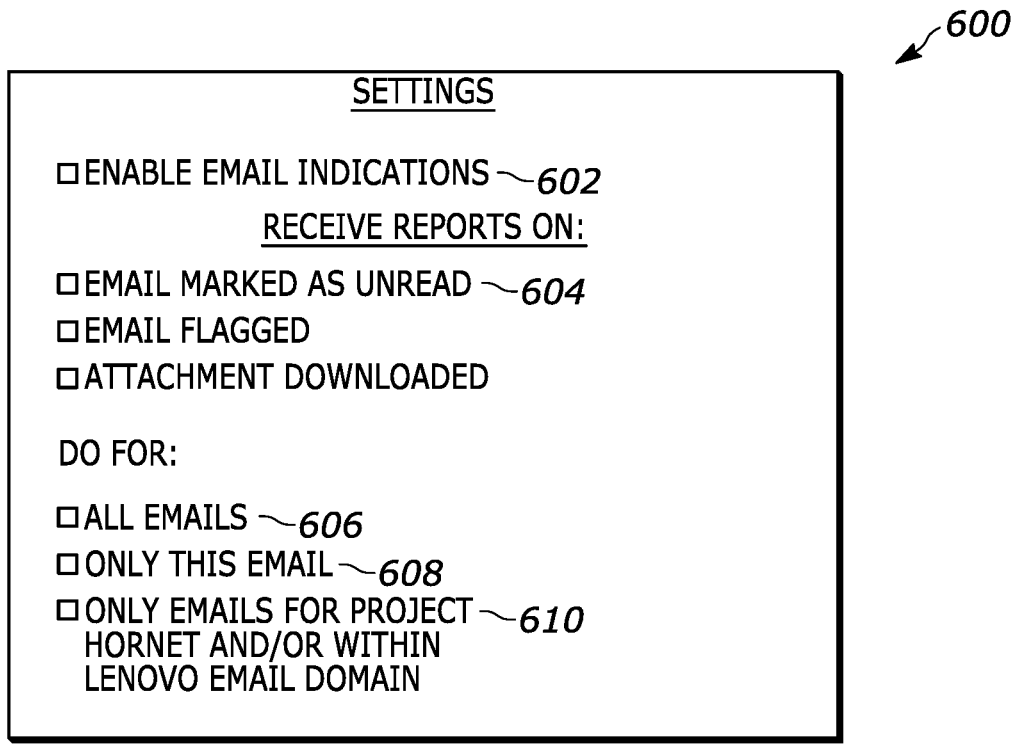
FIGS. 6 and 7 show example settings GUIs that may be respectively presented on message sender and recipient displays to configure one or more settings of respective devices consistent with present principles.

Now describing FIG. 6, it shows an example GUI 600 that may be presented on the display of a device being used to send a message consistent with present principles. For example, the GUI 600 may be presented responsive to a send command to send a message (e.g., selection of a "send" button) but prior to the message actually being sent so that the message can be configured as described above prior to transmission to the recipient. Additionally or alternatively, the GUI 600 may be presented based on the user navigating a settings menu to reach the GUI 600 to configure one or more settings related to message tracking.

As shown in FIG. 6, the GUI 600 may include a first option 602 that may be selectable by directing touch or cursor input to the adjacent check box to set or enable the sending device to receive message indications (e.g., for all messages sent from the device in the future, or for the specific message for which the user has provided the send command). As also shown in FIG. 6, the GUI 600 may also include one or more options 604 that may be selectable for the user to select one or more specific indication types to have presented on a GUI like the GUI 300 of FIG. 3 (again for all messages sent from the device in the future, or for the specific message for which the user has provided the send command). Only three example indication types are shown—message marked unread, message flagged, and message attachment downloaded—but any or all of the indication types disclosed herein may be presented in any appropriate combination.

As indicated above, the option 602 and options 604 may be selected to receive reports or indications on a specific message that the user is attempting to send or for all future messages that might be sent. Thus, in some examples an option 606 may be selected for the user to command the device to apply the selected option(s) 602, 604 to all messages sent in the future, while option 608 may be selected to apply the selected options 602, 604 only to the current message the user has already composed and is attempting to send.

Additionally, in some examples an option 610 may be presented and may be selected to set or enable the device to only apply the tracking preferences indicated via the selected option(s) 602, 604 to messages for a certain project that might be identified by keyword or using AI as described above so that, for example, message tracking may be performed between people working on a common team-based project. Or in other examples the option 610 may be selected to set or enable the device to only apply the tracking preferences indicated via the selected option(s) 602, 604 to messages sent from and to email addresses sharing a common or same domain name (such as "lenovo.com") so that, for example, message tracking may be performed between a team of work people, between a supervisor and employee, or between any people within a company with which a user of the GUI 600 is employed that all use the same email domain name in their respective email addresses.

Figure 7:
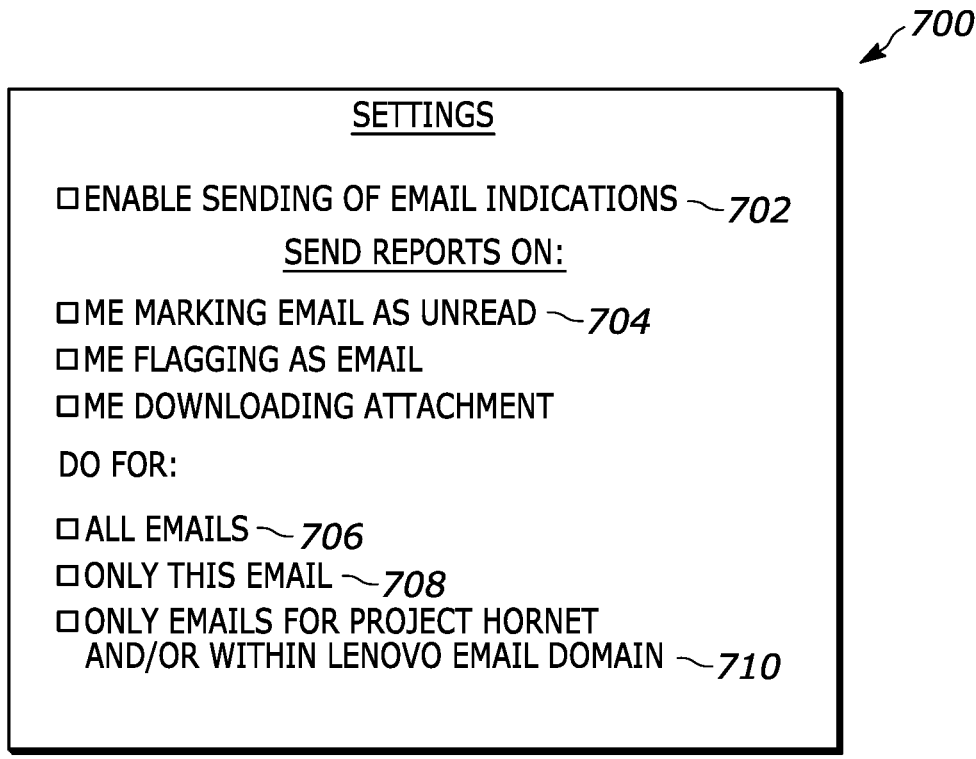

Now describing FIG. 7, it shows an example GUI 700 that may be presented on the display of a device being used to receive a message or that has received a message consistent with present principles. For example, the GUI 700 may be presented responsive to a message being received, or responsive to a command to open a received message but prior to the message actually being opened at the device so that user preferences regarding message tracking can be adopted before any tracking is performed. Additionally or alternatively, the GUI 700 may be presented based on the user navigating a settings menu to reach the GUI 700 to configure one or more settings related to message tracking.

As shown in FIG. 7, the GUI 700 may include a first option 702 that may be selectable to set or enable the receiving device to send message indications (e.g., for all messages received at the device in the future, or for a specific message that has been received and attempted to be opened/acted upon). As also shown in FIG. 7, the GUI 700 may include one or more options 704 that may be selectable for the user to select one or more specific indication types to send to a message sender (again for all messages received at the device in the future, or for the specific message for which the user has provided the input to open). Only three example indication types are shown—message being marked unread, the message being flagged, and message attachment being downloaded—but any or all of the indication types disclosed herein may be presented in any appropriate combination.

As indicated above, the option 702 and options 704 may be selected to send reports or indications on a specific message that the user is attempting to open/act upon, or for all future messages that might be opened/acted upon. Thus, in some examples an option 706 may be selected for the user to command the device to apply the selected option(s) 702, 704 to all messages received in the future, while option 708 may be selected to apply the selected options 702, 704 only to the current message the user is attempting to open.

Additionally, in some examples an option 710 may be presented and may be selected to set or enable the device to only apply the tracking preferences indicated via the selected option(s) 702, 704 to messages for a certain project that might be identified by keyword or using AI as described above so that, for example, message tracking may be performed between people working on a common team-based project. Or in other examples the option 710 may be selected to set or enable the device to only apply the tracking preferences indicated via the selected option(s) 702, 704 to messages received at email addresses sharing a common or same domain name (such as "lenovo.com") so that, for example, message tracking may be performed between a team of work people, between a supervisor and employee, or between any people within a company with which a user of the GUI 700 is employed that all use the same email domain name in their respective email addresses.

Figure 8:
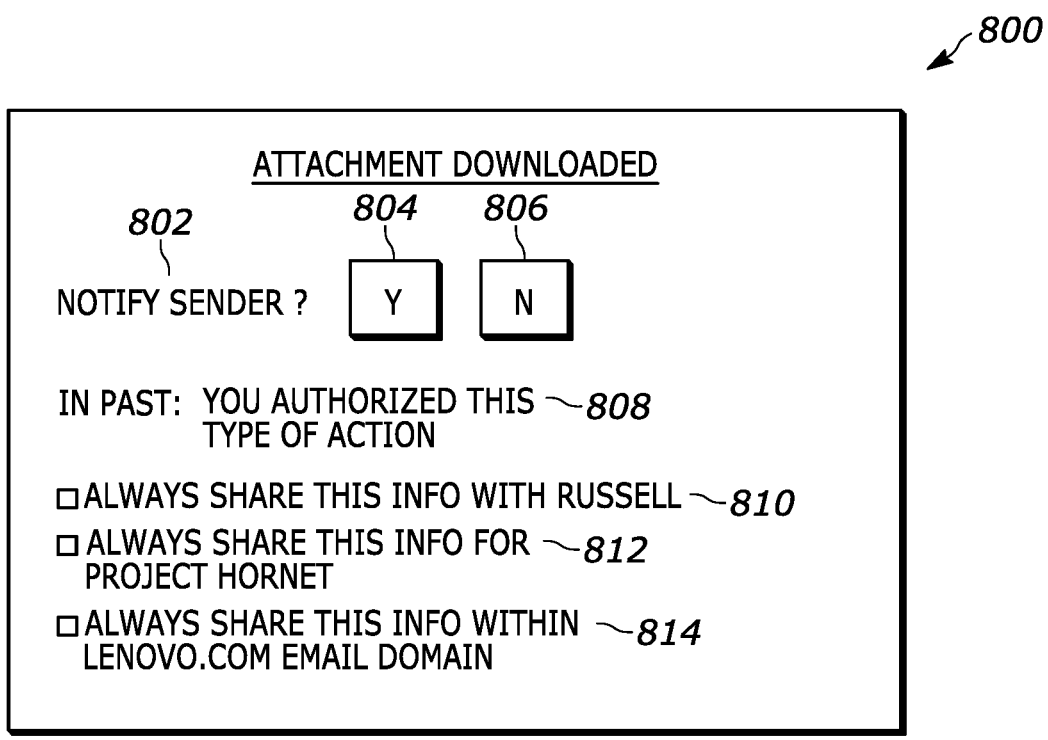
FIG. 8 shows an example GUI that may include an example prompt asking if a message recipient wants to inform a message sender of a specific action the message recipient has taken after the message has been received and acted upon.

Another type of example GUI 800 is shown in FIG. 8. The GUI 800 may be used in addition to or in lieu of the GUI 700. For example, the GUI 800 may be presented not upon a message being opened, but afterwards responsive to a specific action being taken in relation to a received message that may instigate the receiving user's device to send an indication back to the sender regarding the action. In this example, the action is downloading an attachment to the message, such as a slide presentation file, but any of the indications described herein may be the subject of the GUI 800.

As shown in FIG. 8, a prompt 802 asks whether the receiving user wishes to notify the message sender that the message's attachment has been downloaded. Accordingly, a yes selector 804 may be selected to provide permission to notify the sender accordingly, while a no selector 806 may be selected to refuse permission.

A recommendation 808 may also be presented on the GUI 800. The recommendation 808 may have been generated based on a history of past actions by the same user in relation to indications about how a message has been acted upon, and/or based on AI or other software tracking past user habits. As shown in FIG. 8, the recommendation 808 may indicate whether the user has in the past authorized the same type of indication to be provided to a message sender or not (an attachment being downloaded, in this case).

Also, if desired the GUI 800 may include one or more other options such as an option 810 that may be selectable via the adjacent check box to always notify the specific person who sent the message when an attachment download action is taken to download any attachment from that person in any message sent from that person. Additionally or alternatively, the option 812 may be selected to always provide an attachment download indication to a message sender if the message itself relates to a common project being worked on amongst work colleagues (codenamed "Hornet" in this example). Still further, the option 814 may be selected to always provide an attachment download indication to any sender of any message with a message attachment so long as the sender sent the message from an email account having a predefined domain name specified via the text for the option 814 (lenovo.com in this case). Note that in some examples the user may even select the "Lenovo.com" text as presented on the GUI 800 and edit it using a keyboard to specify a different domain name for which the setting should apply.

It may now be appreciated that present principles provide for improved computer-based user interfaces that increase the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor; and
storage accessible to the at least one processor and comprising instructions executable by the at least one processor to:
transmit a message to a second device different from the first device;
receive back an indication from the second device that the message has been acted upon beyond being read by a user using the second device;
present a sent folder for a messaging account from which the message was sent, the sent folder indicating the message and comprising a button that is selectable to present, on a display of the first device, data related to the indication; and
based on selection of the button from the sent folder, present the data related to the indication on the display of the first device, the data indicating that the message has been acted upon in a specified way indicated via the indication.

2. The first device of claim 1, wherein the instructions are executable to:
prior to transmission of the message, configure the message to instigate the second device to transmit the indication upon the message being acted upon using the second device.

3. The first device of claim 1, wherein the indication indicates that the message has been flagged using the second device, wherein flagging the message comprises changing the color, shape, or other appearance of an icon that is associated with the message and that is presented at the second device on or next to one or more of: a message preview, a listing of the message.

4. The first device of claim 1, wherein the indication indicates that the message has been forwarded to a third party using the second device.

5. The first device of claim 1, wherein the indication indicates that an entry has been made in an electronic to do list that relates to a subject of the message, the electronic to do list being maintained by a first application that is different from a second application through which the message was received at the second device.

6. The first device of claim 1, wherein the indication indicates a first amount of text of the message that has been viewed as determined via eye tracking executed using the second device, the first amount of text being less than all of the text of the message.

7. The first device of claim 1, wherein the indication indicates that a reply to the message has been initiated and is currently located in a folder associated with a messaging account through which the message was received.

8. At least one computer readable storage medium (CRSM) that is not a transitory signal, the computer readable storage medium comprising instructions executable by at least one processor to:
transmit a message from a first device to a second device;
receive back an indication from the second device that the message has been acted upon at the second device;
present a sent folder for a messaging account from which the message was sent, the sent folder indicating the message and comprising a selector that is selectable to present, on a display accessible to the first device, data related to the indication; and based on selection of the selector from the sent folder, use the display accessible to the first device to present the data related to the indication.

9. The first device of claim 1, wherein the message is an email.

10. The CRSM of claim 8 wherein the indication indicates that the message has been flagged, wherein flagging the message comprises changing the color, shape, or other appearance of a graphical element associated with the message.

11. The first device of claim 1, wherein the button is a "get info" button.

12. The first device of claim 1, wherein the button is presented next to the message itself as residing in the sent folder.

13. The CRSM of claim 8, wherein the selector comprises a button.

14. The CRSM of claim 8, wherein the selector is presented next to the message itself as residing in the sent folder.

15. A method, comprising:

transmitting a message from a first device to a second device;

receiving back an indication from the second device that the message has been acted upon at the second device;

presenting a sent folder for a messaging account from which the message was sent, the sent folder indicating the message and comprising a selector that is selectable to present, on a display, data related to the indication; and based on selection of the selector from the sent folder, using the display to present the data related to the indication.

16. The method of claim 15, wherein the selector comprises a button.

17. The method of claim 15, wherein the selector comprises a get info button.

18. The method of claim 15, wherein the selector is presented next to the message itself as the message is presented via the sent folder.

19. The method of claim 15, comprising:

prior to transmitting the message, configuring the message to instigate the second device to transmit the indication upon the message being acted upon using the second device.

20. The method of claim 15, wherein the message comprises an email.

* * * * *